United States Patent
Amento et al.

(10) Patent No.: US 8,230,458 B2
(45) Date of Patent: Jul. 24, 2012

(54) SYSTEM AND METHOD OF PROVIDING VIDEO CONTENT COMMENTARY

(75) Inventors: Brian Amento, Morris Plains, NJ (US); Larry Stead, Upper Montclair, NJ (US); Christopher Harrison, Mount Kisco, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 496 days.

(21) Appl. No.: 11/824,479

(22) Filed: Jun. 29, 2007

(65) Prior Publication Data

US 2009/0007200 A1 Jan. 1, 2009

(51) Int. Cl.
*H04H 60/33* (2008.01)
*H04N 7/173* (2011.01)
*G06F 15/16* (2006.01)

(52) U.S. Cl. ........... 725/13; 725/110; 725/115; 709/203

(58) Field of Classification Search .................. None
See application file for complete search history.

(56) References Cited

U.S. PATENT DOCUMENTS

| | | | |
|---|---|---|---|
| 7,716,376 B1 * | 5/2010 | Price et al. ................... 709/248 |
| 7,774,817 B2 * | 8/2010 | Gupta .............................. 725/86 |
| 2003/0101450 A1 | 5/2003 | Davidsson et al. |
| 2003/0182663 A1 * | 9/2003 | Gudorf et al. ................. 725/110 |
| 2005/0108767 A1 * | 5/2005 | Ma ................................. 725/105 |
| 2006/0190966 A1 | 8/2006 | McKissick et al. |
| 2006/0271997 A1 | 11/2006 | Jacoby et al. |
| 2008/0120501 A1 * | 5/2008 | Jannink et al. ................ 713/163 |

* cited by examiner

*Primary Examiner* — Chris Parry
(74) *Attorney, Agent, or Firm* — Toler Law Group, PC

(57) ABSTRACT

A method of providing video content commentary is disclosed that includes sending video content to a first set-top box device at a first time, where the first set-top box device is associated with a first subscriber. The method also includes receiving data corresponding to a comment submitted by the first subscriber. The comment relates to a particular portion of the video content. Further, the method includes sending the video content to a second set-top box device at a second time, where the second set-top box device is associated with a second subscriber. The video content sent to the second set-top box device includes a graphical representation of the comment.

14 Claims, 7 Drawing Sheets

SYSTEM AND METHOD OF PROVIDING VIDEO CONTENT COMMENTARY

FIELD OF THE DISCLOSURE

The present disclosure is generally related to systems and methods of providing video content commentary.

BACKGROUND

Television viewing is a part of daily life for many people. Viewers of particular television programs can enjoy discussing the programs with other viewers. Increasingly, however, viewers are not watching a particular program at the same time, making it more difficult to engage in a discussion during a program. Hence, there is a need for an improved system and method of providing video content commentary.

DETAILED DESCRIPTION OF THE DRAWINGS

Figure 1:
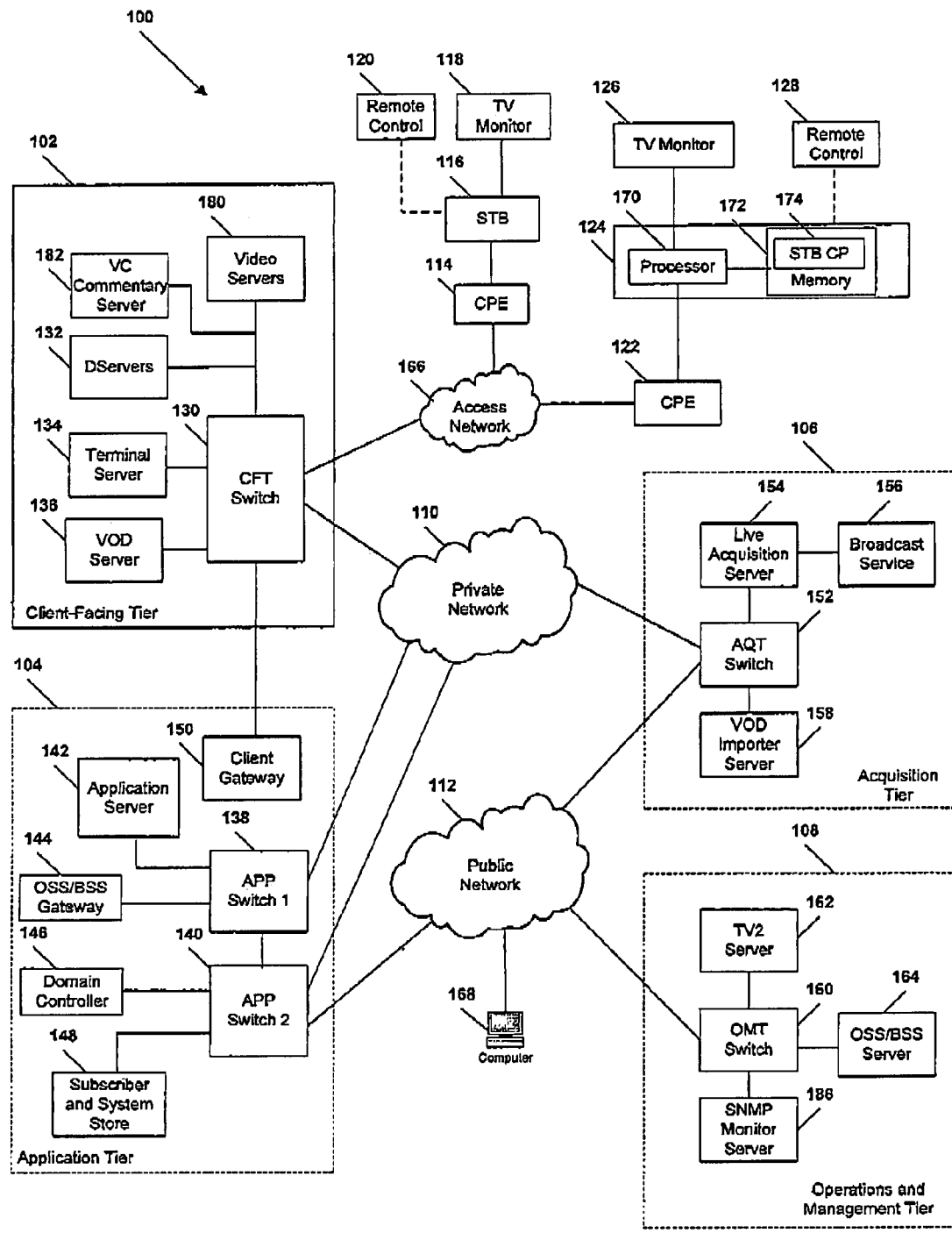
FIG. 1 is a block diagram of a particular embodiment of a system to provide video content commentary.

A system to provide video content commentary is disclosed that includes a processor and a memory accessible to the processor. The memory includes a video content module executable by the processor to send video content to a first set-top box device at a first time and to send the video content to a second set-top box device at a second time. The memory also includes a video content comment module executable by the processor to receive data from the first set-top box device corresponding to a first comment submitted by the first subscriber. The first comment relates to a particular portion of the video content. Further, the video content comment module is executable by the processor to produce a graphical representation of the first comment. The video content sent to the second set-top box device includes the graphical representation of the first comment.

In another embodiment, a set-top box device is disclosed that includes a data storage device, a processor, and a memory accessible to the processor. The memory includes a video content selection module executable by the processor to receive a video content selection from a subscriber associated with the set-top box device. The memory also includes a video content control module executable by the processor to send a request for the selected video content from the set-top box device to a server. Further, the video content control module is executable by the processor to receive the selected video content at the set-top box device with data corresponding to a second subscriber comment. The second subscriber comment relates to a previous viewing of the video content.

In another embodiment, a method of providing video content commentary is disclosed that includes sending video content to a first set-top box device at a first time, where the first set-top box device is associated with a first subscriber. The method also includes receiving data corresponding to a comment submitted by the first subscriber. The comment relates to a particular portion of the video content. Further, the method includes sending the video content to a second set-top box device at a second time, where the second set-top box device is associated with a second subscriber. The video content sent to the second set-top box device includes a graphical representation of the comment.

In another embodiment, a method of providing video content commentary is disclosed that includes sending data associated with a user profile of a first subscriber from a first set-top box device to a server. The user profile includes an identification of a second subscriber associated with a second set-top box device. The method also includes receiving a video content selection from the first subscriber at the first set-top box device and sending a request for the selected video content from the first set-top box device to the server. Further, the method includes receiving the selected video content at the first set-top box device with data corresponding to a comment associated with the second subscriber. The comment relates to a previous viewing of the video content.

In another embodiment, a computer-readable medium is disclosed having instructions to cause a processor to execute a method that includes sending video content to a first set-top box device at a first time, where the first set-top box device is associated with a first subscriber. The computer-readable medium also includes instructions to cause the processor to execute a method including receiving data corresponding to a comment submitted by the first subscriber. The comment relates to a particular portion of the video content. Further, the computer-readable medium includes instructions to cause the processor to execute a method including sending the video content to a second set-top box device at a second time, where the second set-top box device is associated with a second subscriber. The video content sent to the second set-top box device includes a graphical representation of the comment during the particular portion of the video content.

Referring to FIG. 1, an illustrative embodiment of an Internet Protocol Television (IPTV) system that may be used to provide video content commentary is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 166, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a point of connection to the IPTV system 100 via the client-facing tier 102. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that receive video content and transmit the content to the set-top boxes 116, 124 via the access network 166. In addition, the CFT switch can be coupled to one or more video content commentary servers, such as the VC commentary server 182, to allow subscribers to exchange comments regarding video content when the subscribers are synchronously or asynchronously viewing the video content.

In an illustrative embodiment, the client-facing tier 102 can communicate with a large number of set-top boxes, such as the representative set-top boxes 116, 124, over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. In another illustrative embodiment, the subscriber and system store 148 can store data associated with capabilities of set-top box devices associated with particular customers.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular illustrative embodiment, the VC commentary server 182 may receive a user profile from a first subscriber associated with a set-top box device, such as the first representative set-top box device 116. The user profile may include personal data related to the first subscriber. For example, the user profile may include the first subscriber's name, age, gender, favorite television shows, favorite movies, hobbies, other personal information, or any combination thereof. In an illustrative embodiment, the user profile may also include an identification of a second subscriber associated with another set-top box device, such as the second representative set-top box device 124. In an illustrative, non-limiting embodiment, the identification may include an identification number assigned by a video content provider to the second subscriber, the second subscriber's name, a nickname associated with the second subscriber, or any combination thereof. The user profile may also include a plurality of additional identifications of additional subscribers, where each additional subscriber is associated with a respective set-top box device in the IPTV system 100. In an illustrative, non-limiting embodiment, the identifications in the first subscriber user profile may relate to a group of friends and family of the first subscriber. The identifications in the first subscriber user profile may also include recommended subscribers that are recommended by the video content provider to the first subscriber based on matching personal data of the first subscriber with personal data associated with a group of subscribers.

In an illustrative, non-limiting embodiment, the first subscriber user profile may relate to a particular television show. For example, the first subscriber may specify a user profile for a particular television show, such as "ER," and another user profile for sporting events. The respective user profiles may include identifications relating to at least one common subscriber, or the respective user profiles may not have any subscribers in common.

In a particular embodiment, the VC commentary server 182 may receive data corresponding to a comment submitted via the set-top box device 116. The comment may relate to video content provided to the set-top box device 116, such as a particular television show. In an illustrative embodiment, the comment may include a verbal expression that corresponds to a particular portion of the video content provided to the set-top box device 116. For example, the first subscriber may submit the comment, "I love this show!" during a particular scene of the television show. In another example, the comment may include an interest expression corresponding to a particular portion of video content provided to the set-top box device 116. In an illustrative embodiment, the interest expression may include a gesture that indicates approval of the particular portion of the video content, such as a thumbs up gesture or a cheering gesture, a gesture that indicates disapproval of the particular portion of the video content, such as a thumbs down gesture, a gesture that indicates a significance of the particular portion of the video content, such as a pointing gesture, a rating of the particular portion of the video content, a facial expression, such as a happy face or a sad face, or any combination thereof. In another example, the comment may relate to both a verbal expression and an interest expression. The verbal expression, interest expression, or any combination thereof, may be submitted to the set-top box device 116 via an input device associated with the set-top box device 116, such as the remote control 120, a keyboard, mouse, a pointer, some other input device, or any combination thereof.

In a particular embodiment, the VC commentary server 182 identifies one or more subscribers that are included in the user profile of the first subscriber, such as the second subscriber associated with set-top box device 124. The VC commentary server 182 may determine if any of the subscribers included in the first subscriber's user profile are synchronously watching the same video content as the first subscriber. For example, the VC commentary server 182 may determine that the second subscriber associated with the set-top box device 124 is synchronously watching the same video content as the first subscriber. In response to receiving the comment from the set-top box device 116, the VC commentary server 182 may provide data corresponding to a graphical representation of the comment to the set-top box device 124. In an illustrative embodiment, the graphical representation of the comment may be shown on a display device associated with the second set-top box device 124, such as the TV monitor 126. In an illustrative, non-limiting embodiment, the graphical representation of the comment may be temporarily shown on the display device overlaying the video content.

In a particular embodiment, the VC commentary server 182 may be operable to store data corresponding to a comment received via the set-top box device 116. In an illustrative embodiment, the VC commentary server 182 may store the data corresponding to the comment based on a determination that a subscriber included in the first subscriber's user profile, such as the second subscriber associated with the set-top box device 124, is not synchronously watching the same video content as the first subscriber. In a particular embodiment, the VC commentary server 182 may identify the time that the second subscriber requests the video content associated with the comment received from the first subscriber. In an illustrative embodiment, the second subscriber may request the video content associated with the comment after the first subscriber. In an illustrative, non-limiting embodiment, the VC commentary server 182 may identify the time that the particular portion of the video content corresponding to the comment is provided to the set-top box device 124 and subsequently provide data corresponding to a graphical representation of the comment to the set-top box device 124 at that time. Alternatively, the VC commentary server 182 may send the video content to the set-top box device 124 with the data corresponding to the comment inserted at the particular portion of the video content corresponding to the comment.

Figure 2:
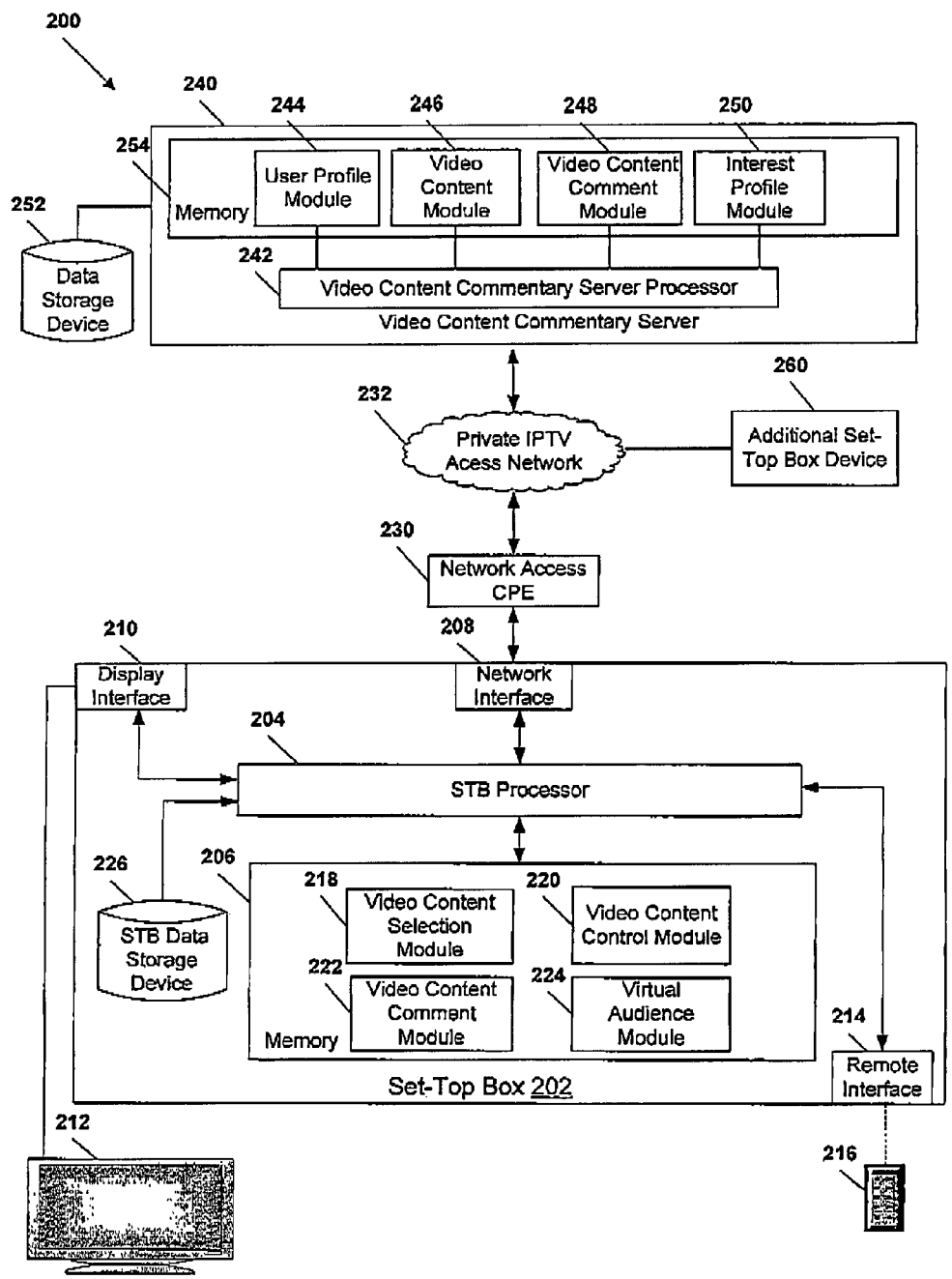
FIG. 2 is a block diagram of a second particular embodiment of a system to provide video content commentary.

FIG. 2 is a block diagram of a second particular embodiment of a system 200 to provide video content commentary. The system 200 includes a set-top box device 202 that communicates with a video content commentary server 240 via a private Internet Protocol Television (IPTV) access network 232. The set-top box device 202 includes a STB processor 204 and a memory 206 accessible to the STB processor 204. The STB processor 204 can communicate video content to a display device 212 via a display interface 210. In addition, the STB processor 204 may communicate with a remote control device 216 via a remote interface 214.

In a particular embodiment, the STB processor 204 may communicate with the private IPTV access network 232 via a network interface 208. In an illustrative, non-limiting embodiment, a customer premises equipment (CPE) 230 may facilitate communication between the network interface 208 and the private IPTV access network 232. The CPE 230 may include a router, a local area network device, a modem, such as a digital subscriber line (DSL) modem, a residential gateway, any other suitable device for facilitating communication between the network interface 208 of the set-top box device 202 and the private IPTV access network 232, or any combination thereof.

In a particular embodiment, the memory 206 may include a video content selection module 218 executable by the STB processor 204 to receive a selection of video content. For example, the video content selection may relate to programming associated with a particular television channel, video on-demand, pay-per view, private video content, or any other programming that may be delivered to the set-top box device 202 for viewing. The video content selection may be received by the set-top box device 202 from an input device, such as the remote control device 216.

In a particular embodiment, the memory 206 may include a video content control module 220 that is executable by the STB processor 204 to send a request for selected video content from the set-top box device 202 to a video content provider server, such as the video content commentary server 240. The video content control module 220 may also be executable by the STB processor 204 to receive the selected video content from the video content commentary server 240. In an illustrative embodiment, the video content may include data corresponding to a comment submitted from an additional set-top box device communicating with the private IPTV access network 232, such as the additional set-top box device 260. There may be a temporal link between the comment and the video content, such that the comment corresponds to a particular portion of the received video content, such as a particular scene of a movie or television show. In an illustrative, non-limiting embodiment, the comment may have been submitted during a showing of the video content at the additional set-top box device 260 that began before the selected video content was received at the set-top box device 202. The video content control module 220 may be executable by the STB processor 204 to send the video content to a display device, such as the display device 212.

In an illustrative embodiment, the video content control module 220 may be executable by the STB processor 204 to store video content at a data storage device, such as the STB data storage device 226. In an illustrative, non-limiting embodiment, the video content may be delivered to the set-top box device 202 according to a predefined schedule. For example, the video content may relate to a particular television show that airs at 8 p.m. on Monday evening. The video content control module 220 may be executable by the STB processor 204 to receive the video content from the video content commentary server 240 as the program is airing and to store the video content in the STB data storage device 226 in response to a request received from the set-top box device 202. In another illustrative, non-limiting embodiment, the video content control module 220 may be executable by the STB processor 204 to download the video content from the video content commentary server 240 at certain times specified by a subscriber associated with the set-top box device 202. Once the video content has been stored at the STB data storage device 226, the video content control module 220 may be executable by the STB processor 204 to receive updates to the video content including additional comments related to the video content that are submitted after the video content has been stored at the STB data storage device 226.

In a particular embodiment, the memory may include a video content comment module 222 that is executable by the STB processor 204 to receive comments related to particular portions of video content received at the set-top box device 202. The video content comment module 222 may be executable by the STB processor 204 to send data relating to each such comment to the video content commentary server 240. In an illustrative embodiment, the data may include a type of comment received; information indicating the video content to which the comment relates; a particular portion of the video content to which the comment relates; an identification of a party making the comment; or any combination thereof. Further, the video content comment module 222 may be executable by the STB processor 204 to store comments made by a particular party, such as a subscriber, associated with the set-top box device 202 at the STB data storage device 226. The video content comment module 222 may be executable by the STB processor 204 to insert the stored comments at the corresponding portions of the video content when the video content is replayed via the set-top box device 202.

Figure 5:
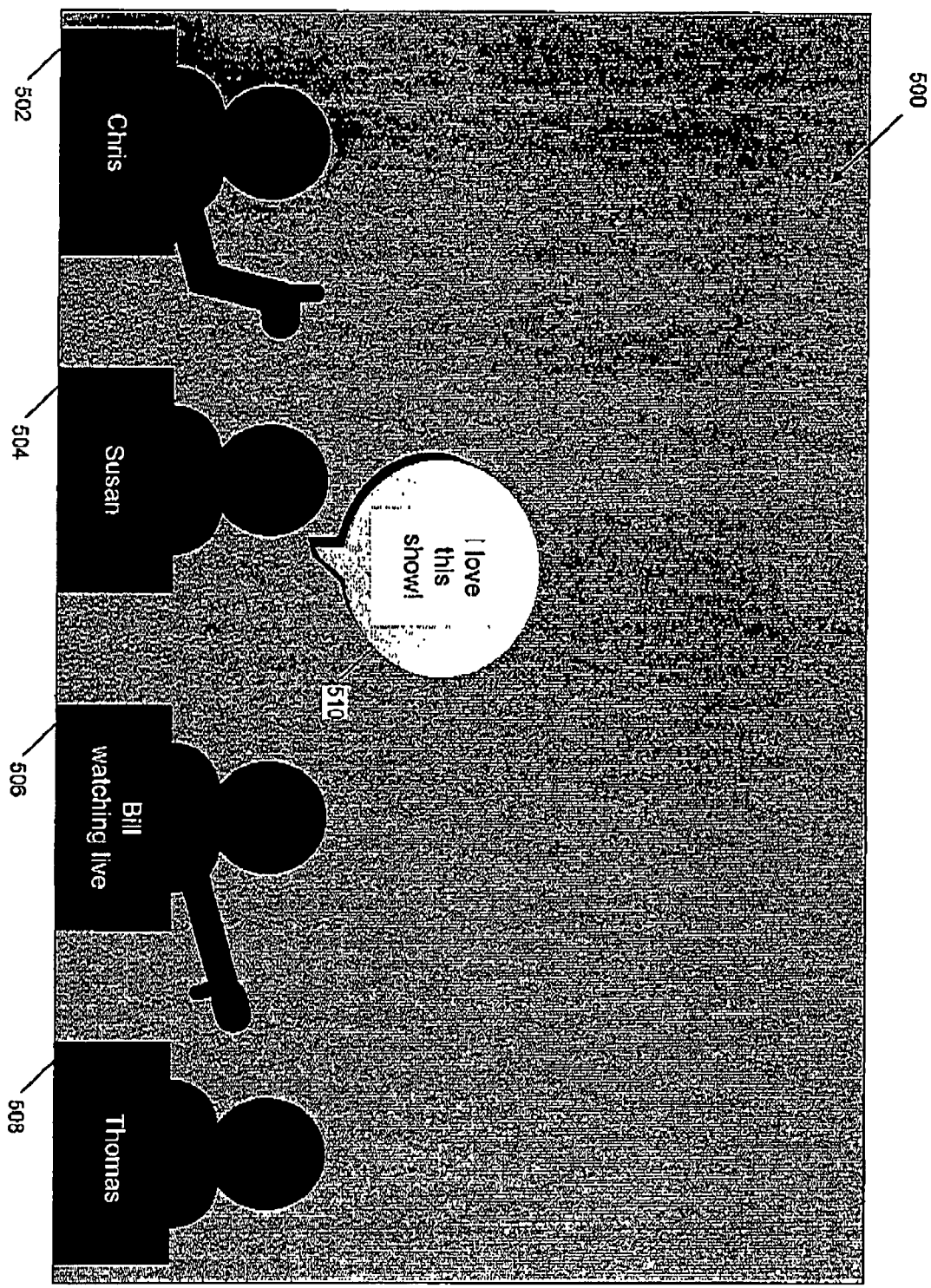
FIG. 5 is a diagram of a particular embodiment of a graphical user interface to provide video content commentary.

In a particular embodiment, the memory 206 may include a virtual audience module 224 that is executable by the STB processor 204 to provide a representation of a virtual audience overlaying video content received at the set-top box device 202. An example of such a virtual audience is illustrated in FIG. 5. In an illustrative embodiment, the virtual audience may include a number of avatars. In an illustrative, non-limiting embodiment, each avatar may be associated with a respective additional subscriber that is associated with a respective additional set-top box device, such as the additional set-top box device 260. The virtual audience may include a predefined number of avatars specified by the video content provider. Alternatively, the virtual audience may include a number of avatars specified by the subscriber associated with the set-top box device 202.

In an illustrative embodiment, the virtual audience may include an avatar of a particular subscriber associated with the additional set-top box device 260. The particular subscriber may be included in a user profile of a subscriber associated with the set-top box device 202. The user profile may include personal data of the subscriber associated with the set-top box device 202 and may identify the particular subscriber associated with the additional set-top box device 260. The virtual audience may be populated with avatars of a plurality of subscribers identified by the user profile of the subscriber associated with the set-top box device 202.

In another illustrative embodiment, the virtual audience may include avatars of subscribers that are selected in response to an audience member request sent from the set-top box device 202 to the video content commentary server 240. The audience member request may include certain personal data of the subscriber associated with the set-top box device 202, such as age, location of residence, and favorite TV show. In response to the audience member request, the set-top box device 202 may receive a number of recommended audience members that match the personal data included in the audience member request. For example, the set-top box device 202 may receive a list of recommended subscribers between the ages of 30 and 39 that live in New York, N.Y. having "Lost" as their favorite television show. In an illustrative, non-limiting embodiment, the virtual audience may automatically be populated with an avatar associated with at least one of the recommended subscribers or the subscriber associated with the set-top box device 202 may select at least one of the recommended subscribers to include in the virtual audience.

In a particular embodiment, a graphical representation of a comment associated with the video content sent to the set-top box device 202 may be shown on the display device 212. In an illustrative embodiment, the comment may include a verbal expression that relates to a particular portion of the video content. For example, a graphical representation of the comment may temporarily appear on the screen during a particular scene of a television show, such as, "I love this show!" In an illustrative, non-limiting embodiment, the graphical representation of the comment may appear in conjunction with the avatar of the subscriber that submitted the comment. In another illustrative embodiment, the comment may include an interest expression that relates to a particular portion of the video content provided to the set-top box device 202. The graphical representation of the interest expression may include a gesture, such as a thumbs up gesture, a thumbs down gesture, a pointing gesture, a cheering gesture, or any combination thereof, that indicates approval, disapproval, or a significance of the particular portion of the video content. In an illustrative, non-limiting embodiment, the graphical representation of the interest expression may temporarily appear on the display device 212 in conjunction with the avatar associated with the subscriber submitting the comment. The comment may also include a rating associated with a particular portion of the video content provided to the set-top box device 202. For example, the comment may indicate a rating of 7/10 for a particular scene, character, or actor/actress of a movie or a joke told during a television show.

In an illustrative embodiment, the avatars included in the virtual audience may include a label that identifies the particular subscriber associated with the corresponding avatar. The label may include the particular subscriber's name, a nickname, an identifier selected by the subscriber associated with the set-top box device 202 relating to the particular subscriber, or any combination thereof. In an illustrative, non-limiting embodiment, the label may appear in conjunction with an avatar throughout the viewing of the video content. In another illustrative, non-limiting embodiment, the label may not appear in conjunction with a specific avatar of the virtual audience. For example, the graphical representation of the comment may appear in conjunction with any avatar of the virtual audience and include a label identifying the particular subscriber making the comment. In an illustrative, non-limiting embodiment, the label may indicate that the particular subscriber is watching the video content synchronously with the subscriber associated with the set-top box device 202.

In an illustrative embodiment, the virtual audience module 224 may be executable by the STB processor 204 to control the appearance of the virtual audience. For example, a subscriber associated with the set-top box device 202 may enter commands via the remote control device 216 to choose the size, shape, color, and image of the avatars associated with each of the members of the virtual audience. In an illustrative, non-limiting embodiment, a particular subscriber may designate a particular avatar that will appear in any virtual audience that includes the particular subscriber.

In a particular embodiment, the video content commentary server 240 includes a video content commentary server processor 242 and a memory 254 that is accessible to the video content commentary server processor 242. The video content commentary server 240 also includes a user profile module 244 that is executable by the video content commentary server processor 242 to receive data associated with a user profile of a subscriber associated with the set-top box device 202. The user profile module 244 may also be executable by the video content commentary server processor 242 to receive user profiles from a plurality of additional subscribers associated with respective additional set-top box devices, such as the additional set-top box device 260. In an illustrative embodiment, the user profile module 244 may be executable by the video content commentary server processor 242 to store the data corresponding to each respective user profile in a data storage device associated with the video content commentary server 240, such as the data storage device 252.

In an illustrative embodiment, the user profile module 244 may be executable by the video content commentary server processor 242 to receive an audience member request from the set-top box device 202. The audience member request may indicate a request by a subscriber associated with the set-top box device 202 to receive recommendations of at least one additional subscriber to include in a virtual audience associated with video content received at the set-top box device 202. In an illustrative, non-limiting embodiment, the audience member request may indicate that the subscriber associated with the set-top box device 202 wants recommendations relating to additional subscribers matching specified criteria, such as a particular age, location of residence, or favorite movie. The user profile module 244 may be executable by the video content commentary server processor 242 to match the criteria submitted by the subscriber associated with the set-top box device 202 with information associated with the additional subscribers. In an illustrative, non-limiting embodiment, the user profile module 244 may be executable by the video content commentary server processor 242 to send data identifying a certain number of recommended audience members to the set-top box device 202. Avatars associated with the recommended audience members may automatically be included in the virtual audience or the subscriber associated with the set-top box device 202 may choose from among the recommended additional subscribers to include in the virtual audience.

In a particular embodiment, the video content commentary server 240 may include a video content module 246 that is executable by the video content commentary server processor 242 to send video content to a set-top box device, such as the set-top box device 202, in response to a request for the video content from the set-top box device 202. In an illustrative, non-limiting embodiment, the video content module 246 may be executable by the video content commentary server processor 242 to stream the requested video content to the set-top box device 202. In another illustrative, non-limiting embodiment, the video content module 246 may be executable by the video content commentary server processor 242 to send the requested video content to the STB data storage device 226 for recording.

In a particular embodiment, the video content commentary server 240 may include a video content comment module 248 that is executable by the video content commentary server processor 242 to receive data from a set-top box device, such as the set-top box device 202, relating to a comment submitted by a subscriber associated with the set-top box device 202. The comment may relate to a particular portion of video content that is being viewed via the set-top box device 202. In an illustrative, non-limiting embodiment, the video content comment module 248 may be executable by the video content commentary server processor 242 to receive data related to a plurality of additional comments submitted by the subscriber associated with the set-top box device 202. The plurality of additional comments may each relate to a respective additional portion of the video content.

In a particular embodiment, the video content comment module 248 may also be executable by the video content commentary processor 242 to generate a graphical representation corresponding to each comment received at the video content commentary server 240. In an illustrative embodiment, the video content comment module 248 may be executable by the video content commentary server processor 242 to identify additional subscribers that are designated to receive graphical representations of the comments submitted via the set-top box device 202. For example, the video content module 248 may be executable by the video content commentary server processor 242 to identify the subscribers included in a user profile of a subscriber associated with the set-top box device 202. The designated additional subscribers may each be associated with a respective set-top box device, such as the additional set-top box device 260. In an illustrative embodiment, the video content module 248 may also be executable by the video content commentary server processor 242 to produce graphical representations of comments received from a particular additional set-top box device and to provide the graphical representations to the set-top box device 202 and to other specified set-top box devices.

In an illustrative embodiment, the video content comment module 248 may be executable by the video content commentary server processor 242 to identify the designated additional subscribers that are synchronously watching the same video content as the subscriber associated with the set-top box device 202. The video content comment module 248 may be executable by the video content commentary server processor 242 to forward the graphical representation of a comment received from the set-top box device 202 to the set-top box devices associated with the designated additional subscribers that are synchronously watching the same video content as the subscriber associated with the set-top box device 202.

In an illustrative embodiment, the video content comment module 248 may also be executable by the video content commentary server processor 242 to store data relating to a comment received from the set-top box device 202 at a data storage device 252 associated with the video content commentary server 240. The comment may relate to a particular portion of video content received at the set-top box device 202. The video content comment module 248 may be executable by the video content commentary server processor 242 to send a graphical representation relating to the stored comment data to an additional designated set-top box device in response to a request for the video content from the additional designated set-top box device when the additional designated set-top box device is not synchronously receiving the video content with the set-top box device 202. In an illustrative, non-limiting embodiment, the video content comment module 248 may be executable by the video content commentary server processor 242 to insert the graphical representation of the comment at the particular portion of the video content to which the comment relates. For example, the video content comment module 248 may be executable by the video content commentary server processor 242 to identify that a comment was submitted at time 19:35 of the video content and insert a graphical representation of the comment into the video content at the same time. The graphical representation of the comment may be inserted into the video content before the video content is requested by the additional designated set-top box device or while the video content is being provided to the additional designated set-top box device.

In a particular embodiment, the video content commentary server 240 includes an interest profile module 250 that is executable by the video content commentary server processor 242 to generate an interest profile that indicates similarities and differences between comments submitted by a group of subscribers, including a subscriber associated with the set-top box device 202. The interest profile module 250 may be executable by the video content commentary server processor 242 to generate a graphical representation of the interest profile. In an illustrative embodiment, the interest profile module 250 may be executable by the video content commentary server processor 242 to send data related to an interest profile to the set-top box device 202. The data related to the graphical representation of the interest profile may be sent to the set-top box device 202 in response to a request entered by a subscriber associated with the set-top box device 202 via an input device, such as the remote control device 216.

Figure 6:
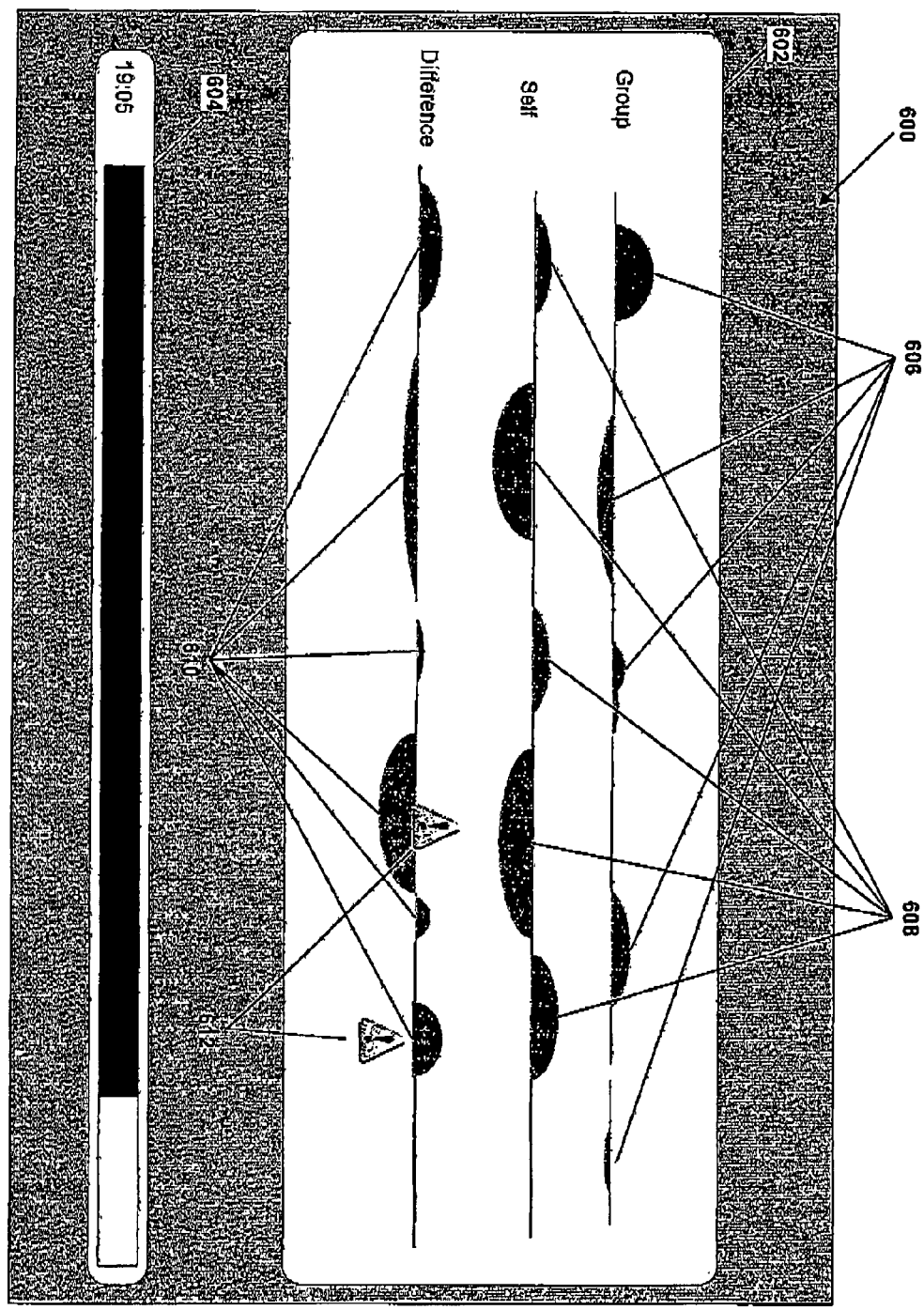
FIG. 6 is a diagram of a second particular embodiment of a graphical user interface to provide video content commentary.

In an illustrative embodiment, the graphical representation of the interest profile may include at least one graph indicating the portions of the video content associated with a comment submitted by a subscriber associated the set-top box device 202. An example of a graphical user interface of such an interest profile is illustrated in FIG. 6. The graphical representation of the interest profile may indicate that the respective comments represent approval or disapproval with respect to the corresponding portions of the video content. In an illustrative, non-limiting embodiment, the graphical representation of the interest profile may include a graph indicating the portions of the video content where comments were made by a plurality of additional subscribers that have viewed or are currently viewing the video content. The plurality of additional subscribers may each be associated with a respective additional set-top box device, such as the additional set-top box device 260. In an illustrative, non-limiting embodiment, the plurality of additional subscribers may correspond to a virtual audience associated with the subscriber associated with the set-top box device 202. The graphical representation of the interest profile may show graphs relating to feedback for each of the plurality of additional subscribers or for the plurality of additional subscribers as a group. In an illustrative, non-limiting embodiment, the graphical representation of the interest profile may indicate portions of the video content where the subscriber associated with the set-top box device 202 has submitted feedback that is in disagreement with the feedback submitted by the plurality of additional subscribers. For example, a disagreement icon may appear on a graph of the graphical representation of the interest profile at the portion of the video content where the disagreement occurs.

In an illustrative embodiment, the graphical representation of the interest profile may temporarily overlay video content shown on a display device, such as the display device 212. The graphical representation of the interest profile may also be viewed as a stand-alone screen. In an illustrative, non-limiting embodiment, the graphical representation of the interest profile may include graphs having feedback indicators for a particular length of the video content, such as 20 minute intervals, or for the entire length of the video content. In another illustrative, non-limiting embodiment, the graphical representation of the interest profile may indicate the portion of the video content that each subscriber associated with the virtual audience is viewing. For example, the graphical representation of the interest profile may indicate that one subscriber is viewing minute 20:00 of the video content and that another subscriber is viewing minute 1:00 of the video content.

For ease of explanation, the various modules 218-224 and 244-250 have been described in terms of processor-executable instructions. However, those skilled in the art will appreciate that such modules can be implemented as hardware logic, processor-executable instructions, or any combination thereof.

Figure 3:
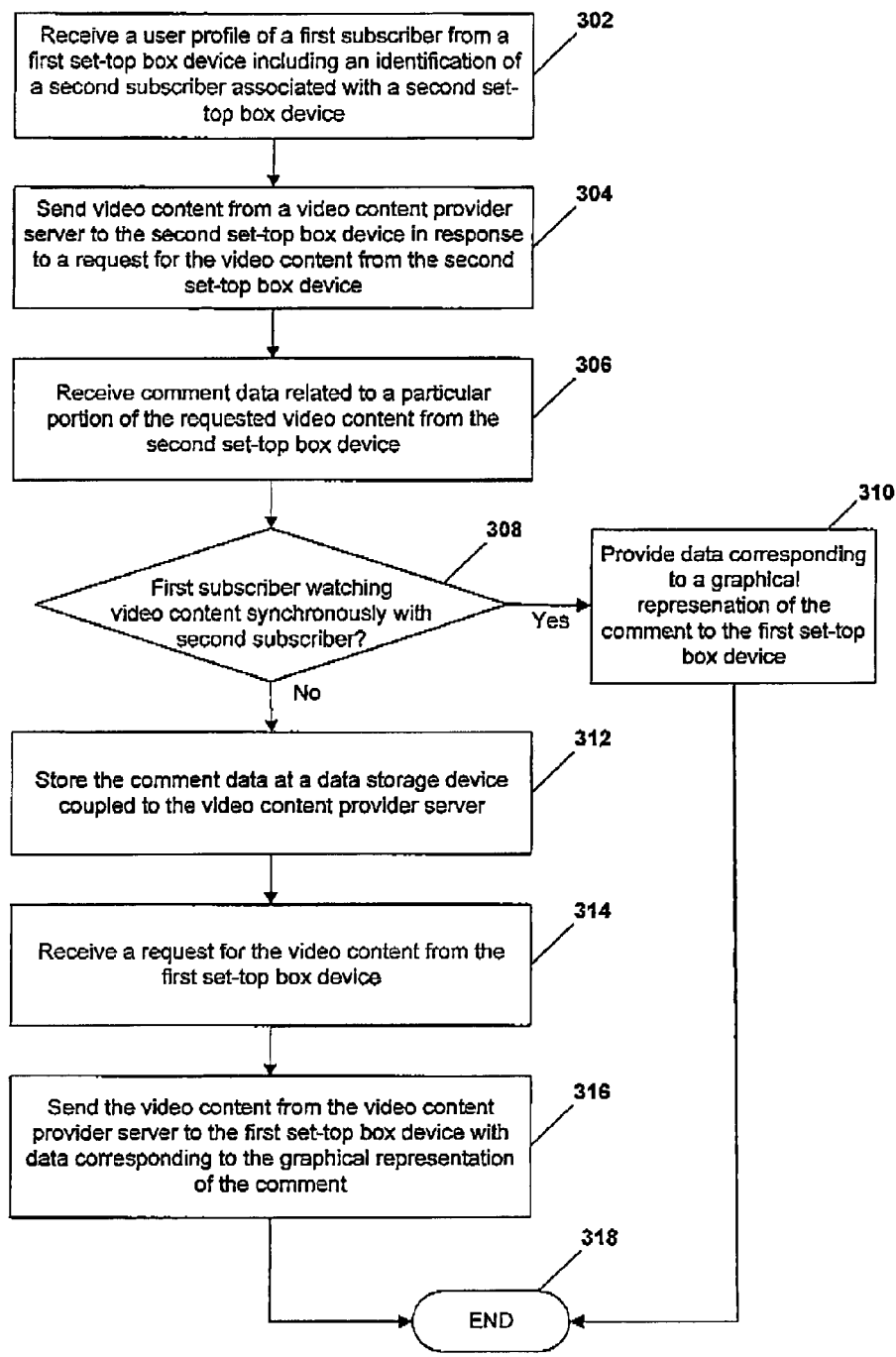
FIG. 3 is a flow diagram of a particular embodiment of a method of providing video content commentary.

FIG. 3 is a flow diagram of a particular illustrative embodiment of a method of providing video content commentary. At block 302, a user profile of a first subscriber is received from a first set-top box device. The user profile may include an identification of a second subscriber associated with a second set-top box device. Moving to block 304, video content is sent from a video content provider server, such as a video content commentary server, to the second set-top box device in response to receiving a request for the video content from the second set-top box device. Proceeding to block 306, comment data is received at the video content provider server from the second set-top box device. The comment may relate to a particular portion of the requested video content. The comment may include a verbal expression, an interest expression, such as a thumbs up gesture or a thumbs down gesture, a rating, or any combination thereof.

At decision block 308, if the first subscriber is watching video content synchronously with the second subscriber, then the method proceeds to block 310. At block 310, data corresponding to a graphical representation of the comment is provided to the first set-top box device. The method then terminates at 318.

On the other hand, if the first subscriber is not watching the video content synchronously with the second subscriber, the method proceeds to block 312. At block 312, data corresponding to the comment is stored at a data storage device coupled to the video content provider server. Moving to block 314, the video content provider server receives a request for the video content from the first set-top box device. Proceeding to block 316, the video content is sent to the first set-top box device with data corresponding to the graphical representation of the comment. The method terminates at 318.

Figure 4:
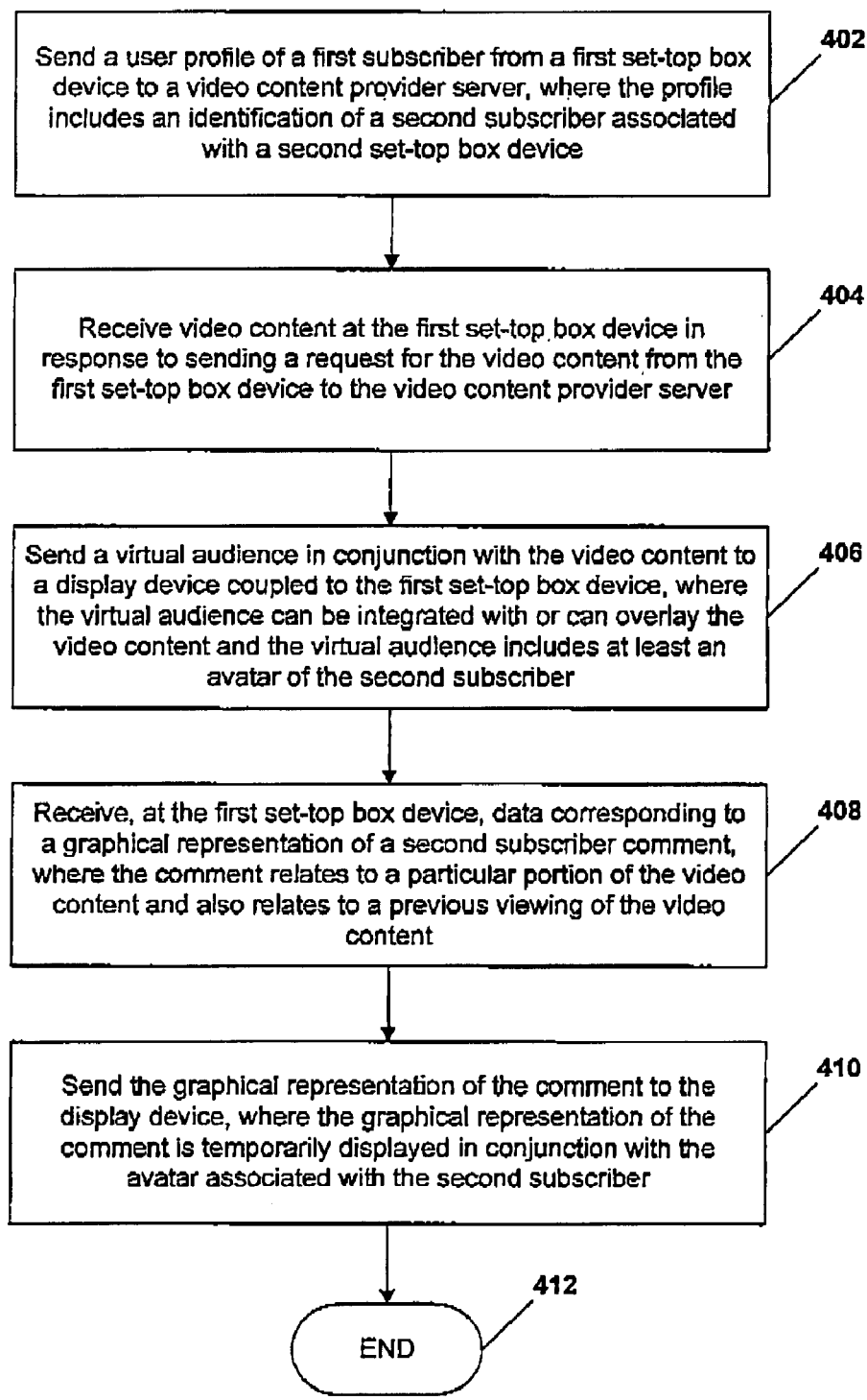
FIG. 4 is a flow diagram of a second particular embodiment of a method of providing video content commentary.

FIG. 4 is a flow diagram of a second particular illustrative embodiment of a method of providing video content commentary. At block 402, a user profile of a first subscriber is sent from a first set-top box device to a video content provider server, such as a video content commentary server. The user profile may include an identification of a second subscriber associated with a second set-top box device. Moving to block 404, video content is received at the first set-top box device in response to sending a request for the video content from the first set-top box device to the video content provider server.

Proceeding to block 406, a virtual audience is sent in conjunction with the video content to a display device coupled to the first set-top box device. The virtual audience can be integrated with or can overlay the video content and it includes at least an avatar of the second subscriber. At block 408, data corresponding to a graphical representation of a second subscriber comment is received at the first set-top box device. The comment may relate to a particular portion of the video content and may also relate to a previous viewing of the video content. Moving to block 410, the graphical representation of the comment is sent to the display device. The graphical representation of the comment may be temporarily displayed in conjunction with the avatar associated with the second subscriber. The method terminates at 412.

FIG. 5 is a display screen showing an illustrative embodiment of a graphical user interface (GUI) 500 to provide video content commentary. The GUI 500 shows a virtual audience that may be overlaying video content received at a particular set-top box device. The video content may be viewed by a particular subscriber associated with the particular set-top box device. The avatars 502, 504, 506, 508 may each be associated with an additional subscriber associated with a respective additional set-top box device. In an illustrative, non-limiting embodiment, the group of subscribers associated with the avatars 502, 504, 506, 508 may be watching the video content synchronously with the particular subscriber, may have previously watched the video content, or may have not yet watched the video content. The virtual audience may include an avatar corresponding to the particular subscriber.

Each avatar 502, 504, 506, 508 may include a label identifying the respective subscriber associated with the avatar. For example, the avatar 502 is associated with the label "Chris" and the avatar 504 is associated with the label "Susan." An avatar may also indicate when the respective subscriber corresponding to an avatar is watching synchronously with the particular subscriber. For example, the avatar 506 is associated with the label "Bill" and shows that he is "watching live."

The GUI 500 may also include comments made by subscribers associated with the avatars included in the virtual audience. For example, the avatar 502 shows a thumbs up interest expression that may indicate positive feedback or approval by the subscriber associated with the avatar 502, where the feedback or approval relates to the particular portion of the video content that is currently being viewed via the particular set-top box device. In addition, the avatar 506 shows a thumbs down interest expression that may indicate negative feedback or disapproval by the subscriber associated with the avatar 506 of the particular portion of the video content that is currently being viewed. Further, the GUI 500 may also include verbal expressions submitted by subscribers corresponding to the avatars in the virtual audience. For example, the avatar 504 is associated with a verbal expression 510 entered by the subscriber associated with the avatar 504. The verbal expression 510 may relate to the particular portion of the video content currently being viewed. Additionally, the verbal expression may not be related to the particular portion of the video content currently being shown. For example, the verbal expression may include a greeting to the other subscribers associated with the avatars of the virtual audience.

In an illustrative, non-limiting embodiment, the avatars 502, 504, 506, 508 may not include a fixed label. Instead, a subscriber submitting a comment, such as a verbal expression or an interest expression, may be identified when the comment is shown on the display screen. Thus, any of the avatars 502, 504, 506, 508 may be used to show comments made by subscribers associated with the virtual audience and there may be more subscribers associated with the virtual audience than there are avatars.

FIG. 6 is a display screen showing a second illustrative embodiment of a graphical user interface (GUI) 600 to provide video content commentary. The GUI 600 includes an interest profile 602 and a video content counter 604. The interest profile 602 includes indications of approval or disapproval of particular portions of video content provided to a set-top box device. The GUI 600 may appear as an overlay of the video content. The video content counter 604 indicates a time during the video content when comments of negative feedback and when comments of positive feedback were expressed for the video content.

The interest profile may include a number of graphs showing areas of approval or disapproval for respective subscribers. For example, the interest profile 602 may include a "self" graph that includes indications of approval or disapproval for a subscriber that has requested to view the interest profile. In addition, the interest profile 602 may include a "group" graph that includes indications of approval or disapproval for a group of subscribers that have watched or are currently watching the video content. Further, the interest profile 602 may include a "difference" graph that indicates the differences between the "self" and "group" graphs.

The areas of approval may be represented as raised areas on the graphs and the areas of disapproval may be represented as recessed areas on the graph. The magnitude of the approval or disapproval of the particular portion of the video content is indicated by the amount of area above or below the centerline. The magnitude of approval or disapproval may represent a rating of the respective portion of the video content or relate to a number of approval or disapproval inputs entered with respect to a particular portion of the video content. Areas of approval and disapproval for the "group" graph are shown at areas 606 of the interest profile 602. Areas of approval and disapproval for the "self" graph are shown at areas 608 of the interest profile 602. The areas of difference between the "self" graph and the "group" graph are indicated by areas 610 of the interest profile 602. The magnitude of the differences between the "self" and "group" graphs is indicated by the area above or below the centerline. Areas of strong disagreement may be shown by a specified indicator, such as the indicators 612.

Figure 7:
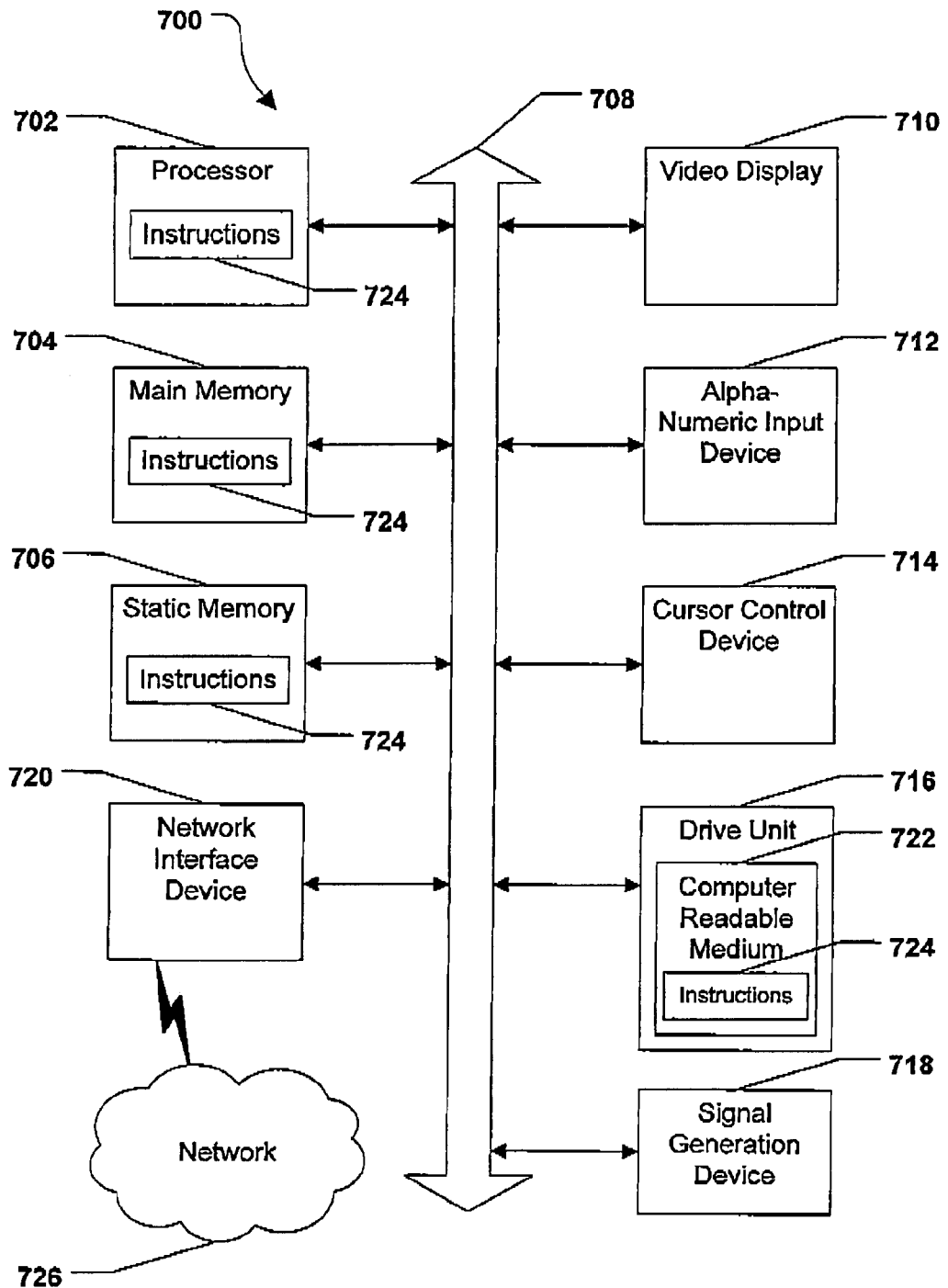
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a video content commentary server or set-top box device, as shown in FIGS. 1-2.

In a networked deployment, the computer system may operate in the capacity of an IPTV server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 604, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing video content commentary, the method comprising:
   sending video content to a first set-top box device at a first time, the first set-top box device associated with a first subscriber;
   receiving data at the server, the data corresponding to a comment submitted by the first subscriber, wherein the comment is associated with a particular portion of the video content;
   sending the video content to a second set-top box device at a second time, the second set-top box device associated with a second subscriber;
   determining, at the server, that the video content is not being synchronously played via the first set-top box device and the second set-top box device;
   storing the data corresponding to the comment submitted by the first subscriber at the server conditioned on the determination that the video content is not being synchronously played via the first set-top box device and the second set-top box device;
   receiving a request at the server from the set-top box device for the video content associated with the comment submitted by the first subscriber; and
   sending the video content to the second set-top box device after receiving the request, wherein the video content that is sent includes the comment submitted by the first subscriber inserted at the particular portion of the video content.

2. The method of claim 1, wherein the first subscriber and the second subscriber are represented in a virtual audience that is displayed concurrently with the video content at a display associated with the second set-top box device, wherein the virtual audience includes a first avatar associated with the first subscriber and a second avatar associated with the second subscriber.

3. The system of claim 1, wherein the determination that the video content is not being synchronously played via the first set-top box device and the second set-top box device is conditioned on determining that the first subscriber is associated with a user profile of the second subscriber.

4. The method of claim 3, wherein the user profile includes one of a location of a subscriber, a favorite movie associated with the subscriber, and an age associated with the subscriber.

5. The method of claim 1, wherein the data corresponding to the comment is sent to the second set-top box device as a graphical representation of the comment.

6. The method of claim 1, wherein the data corresponding to the comment is stored at the server conditioned only upon the determination that the video content is not being synchronously played via the first set-top box device and the second set-top box device.

7. A system to provide video content commentary, the system comprising: a server, wherein the server comprises:
   a processor; and
   a memory accessible to the processor, the memory comprising:
      a video content module, the video content module including a first set of instructions that are executable by the processor to send video content to a first set-top box device at a first time and to send the video content to a second set-top box device at a second time, wherein the first set-top box device is associated with a first subscriber and the second set-top box device is associated with a second subscriber; and
      a video content comment module, the video content comment module including a second set of instructions that are executable by the processor to:
         receive data, the data corresponding to a comment submitted by the first subscriber, wherein the comment is associated with a particular portion of the video content;
         determine that the video content is not being synchronously played via the first set-top box device and the second set-top box device;
         store the data corresponding to the comment submitted by the first subscriber at the memory conditioned on the determination that the video content is not being synchronously played via the first set-top box device and the second set-top box device; and send the video content to the second set-top box device after receiving a request from the second set-top box device for the video content associated with the comment submitted by the first subscriber, wherein the video content that is sent includes the comment submitted by the first subscriber inserted at the particular portion of the video content.

8. The system of claim 7, wherein determining that the video content is not being synchronously played via the first set-top box device and the second set-top box device is conditioned on a determination that the first subscriber is associated with a user profile of the second subscriber.

9. The system of claim 8, wherein the user profile of the second subscriber is based on information associated with the second subscriber, the information including one of a location of a subscriber, a favorite movie associated with the subscriber, and an age associated with the subscriber.

10. The system of claim 7, wherein the memory further includes a virtual audience module executable by the processor to provide a representation of a virtual audience as a visual overlay presented concurrently with the video content, wherein the representation of the virtual audience comprises an avatar associated with the first subscriber.

11. The system of claim 7, wherein the data corresponding to the comment is sent to the second set-top box device as a graphical representation of the comment.

12. A non-transitory computer-readable storage medium comprising:

operational instructions that when executed by a processor, cause the processor to send video content to a first set-top box device at a first time, the first set-top box device associated with a first subscriber;

operational instructions that when executed by the processor, cause the processor to receive data, the data corresponding to a comment submitted by the first subscriber, wherein the comment is associated with a particular portion of the video content;

operational instructions that when executed by a processor, cause the processor to send the video content to a second set-top box device at a second time, the second set-top box device associated with a second subscriber;

operational instructions that when executed by the processor, cause the processor to determine that the video content is not being synchronously played via the first set-top box device and the second set-top box device;

operational instructions that when executed by the processor, cause the processor to store the data corresponding to the comment submitted by the first subscriber at a server conditioned on the determination that the video content is not being synchronously played via the first set-top box device and the second set-top box device;

operational instructions that when executed by the processor, cause the processor to receive a request at the server from the second set-top box device for the video content associated with the comment submitted by the first subscriber; and operational instructions that when executed by the processor, cause the processor to send the video content to the second set-top box device after receiving the request, wherein the video content that is sent includes the comment submitted by the first subscriber inserted at the particular portion of the video content.

13. The non-transitory computer-readable storage medium of claim 12, wherein sending the data corresponding to the comment to the second set-top box device is conditioned on determining that the first subscriber is associated with a user profile of the second subscriber.

14. The non-transitory computer-readable storage medium of claim 12, wherein the data corresponding to the comment is sent to the second set-top box device as a graphical representation of the comment.

* * * * *